(12) United States Patent
Pickering (10) Patent No.: US 8,419,109 B2
(45) Date of Patent: Apr. 16, 2013

(54) DEVICE FOR IMPROVING A TRACTOR-TRAILER COMBINATION TRUCK AERODYNAMICS IN THE GAP BETWEEN THE TRACTOR AND TRAILER

(75) Inventor: Jay Frederick Pickering, Seattle, WA (US)

(73) Assignee: DragGone Aerodynamics, Inc., Seattle, WA (US)

( * ) Notice: Subject to any disclaimer, the term of this patent is extended or adjusted under 35 U.S.C. 154(b) by 131 days.

(21) Appl. No.: 12/854,028

(22) Filed: Aug. 10, 2010

(65) Prior Publication Data

US 2011/0037290 A1   Feb. 17, 2011

Related U.S. Application Data

(60) Provisional application No. 61/233,084, filed on Aug. 11, 2009.

(51) Int. Cl.
*B60J 1/00* (2006.01)

(52) U.S. Cl.
USPC .................................................... 296/180.2

(58) Field of Classification Search .......... 296/180.2, 296/91, 180.3, 180.1, 180.4, 180.5; 280/423.1
See application file for complete search history.

(56) References Cited

U.S. PATENT DOCUMENTS

| | | | | |
|---|---|---|---|---|
| 3,834,752 A | * | 9/1974 | Cook et al. | 180/309 |
| 3,945,677 A | * | 3/1976 | Servais et al. | 296/180.2 |
| 4,036,519 A | * | 7/1977 | Servais et al. | 296/180.2 |
| 4,142,755 A | * | 3/1979 | Keedy | 296/180.2 |
| 4,311,334 A | * | 1/1982 | Jenkins | 296/180.4 |
| 4,343,505 A | * | 8/1982 | Levassor | 296/180.2 |
| 4,343,506 A | * | 8/1982 | Saltzman | 296/24.31 |
| 4,357,045 A | * | 11/1982 | Kinford, Jr. | 296/180.2 |
| 4,458,937 A | * | 7/1984 | Beckmann et al. | 296/180.3 |
| 4,518,188 A | | 5/1985 | Witten | |
| 4,611,796 A | * | 9/1986 | Orr | 296/180.2 |
| 4,611,847 A | * | 9/1986 | Sullivan | 296/180.2 |
| 4,685,715 A | | 8/1987 | Hardin | |
| 4,688,841 A | | 8/1987 | Moore | |
| 4,746,160 A | * | 5/1988 | Wiesemeyer | 296/180.2 |
| 4,750,772 A | * | 6/1988 | Haegert | 296/180.2 |
| 4,775,179 A | * | 10/1988 | Riggs | 296/180.2 |
| 4,883,307 A | * | 11/1989 | Hacker et al. | 296/180.2 |
| 4,904,015 A | * | 2/1990 | Haines | 296/180.3 |
| 4,932,716 A | * | 6/1990 | Marlowe et al. | 296/180.2 |
| 4,957,322 A | * | 9/1990 | Marlowe et al. | 296/180.2 |
| 5,078,448 A | * | 1/1992 | Selzer et al. | 296/180.2 |
| 5,190,342 A | | 3/1993 | Marlowe et al. | |

(Continued)

*Primary Examiner* — Kiran B Patel
(74) *Attorney, Agent, or Firm* — Davis Wright Tremaine LLP; Heather M. Colburn (57) ABSTRACT

A device for reducing drag experienced at a gap between a trailer coupled to a tractor. The device includes an enclosure having a top portion extending between a first side portion and a second side portion. Forward portions of the first and second side portions of the enclosure are coupled to first and second spool assemblies, respectively, coupled to a rear portion of the tractor and configured to maintain tension in the first and second side portions, respectively, of the enclosure. Rearward portions of the top, first side, and second side portions of the enclosure are coupled to the trailer by a coupling assembly. The first side portion extends from the first spool assembly to the trailer. The second side portion of the enclosure extends from the second spool assembly to the trailer. The top portion covers at least a portion of the gap defined between the tractor and trailer.

17 Claims, 10 Drawing Sheets

U.S. PATENT DOCUMENTS

| | | | | |
|---|---|---|---|---|
| 5,522,637 A * | 6/1996 | Spears | | 296/180.3 |
| 5,560,673 A * | 10/1996 | Angelo | | 296/26.02 |
| 5,595,419 A * | 1/1997 | Spears | | 296/180.2 |
| 5,685,597 A * | 11/1997 | Reid | | 296/180.1 |
| 6,267,434 B1 * | 7/2001 | Casillas | | 296/180.1 |
| 6,343,613 B1 * | 2/2002 | Yasutomi | | 135/88.01 |
| 6,428,084 B1 * | 8/2002 | Liss | | 296/180.3 |
| 6,557,230 B1 * | 5/2003 | Gernstein | | 29/401.1 |
| 6,846,031 B2 | 1/2005 | Wong et al. | | |
| 6,886,882 B2 * | 5/2005 | Farlow et al. | | 296/180.4 |
| 6,932,419 B1 | 8/2005 | Mccullough | | |
| 7,114,757 B1 * | 10/2006 | Dangler | | 296/37.6 |
| 7,374,229 B1 * | 5/2008 | Noll et al. | | 296/180.2 |
| D593,907 S * | 6/2009 | Piedy | | D12/96 |
| 7,712,822 B2 * | 5/2010 | Pfaff | | 296/180.2 |
| 7,971,918 B2 * | 7/2011 | Oriet et al. | | 296/26.09 |
| 8,123,281 B2 * | 2/2012 | Perkins et al. | | 296/180.2 |
| 8,167,358 B2 * | 5/2012 | Burrows | | 296/180.1 |

* cited by examiner

DEVICE FOR IMPROVING A TRACTOR-TRAILER COMBINATION TRUCK AERODYNAMICS IN THE GAP BETWEEN THE TRACTOR AND TRAILER

CROSS REFERENCE TO RELATED APPLICATION(S)

This application claims the benefit of U.S. Provisional Application No. 61/233,084, filed Aug. 11, 2009, which is incorporated herein by reference in its entirety.

BACKGROUND OF THE INVENTION

1. Field of the Invention

The present invention relates generally to devices for reducing the amount of air drag on a moving vehicle, and more particularly but not by way of limitation, to the devices for reducing the amount of air drag experienced in a gap defined between a tractor and a trailer of a conventional tractor-trailer combination truck.

2. Description of the Related Art

It is well known that a vehicle, such as a conventional tractor-trailer combination truck having a substantially flat surface along the back of the tractor and a substantially flat front surface along the trailer, experiences a significant amount of air drag in the gap defined between the tractor and trailer while traveling along a road or highway. The passage of the vehicle through the atmosphere creates an area of low pressure in the gap that causes drag on the vehicle and increases both the rate of fuel consumption and the amount of pollution output.

A number of devices have been developed to reduce air drag experienced in the gap between a tractor and trailer. Examples of such devices are contained in the following patents: U.S. Pat. No. 7,374,229 issued to Noll and Sadler; U.S. Pat. No. 6,846,031 issued to Wong et al.; U.S. Pat. No. 6,932,419 issued to McCullough; U.S. Pat. No. 5,190,342 issued to Marlowe et al.; U.S. Pat. No. 4,904,015 issued to Haines; U.S. Pat. No. 4,746,160 issued to Wiesemeyer; U.S. Pat. No. 4,688,841 issued to Moore; U.S. Pat. No. 4,685,715 issued to Hardin; U.S. Pat. No. 4,518,188 issued to Witten; and U.S. Pat. No. 4,036,519 issued to Servais et al.

A need exists for devices that reduce drag on a vehicle particularly drag experienced at the gap defined between a tractor and a trailer of a conventional tractor-trailer combination truck. Devices that reduce the rate of fuel consumption and/or pollution output of the truck would be particularly desirable. The present application provides these and other advantages as will be apparent from the following detailed description and accompanying figures.

DETAILED DESCRIPTION OF THE INVENTION

Figure 1:
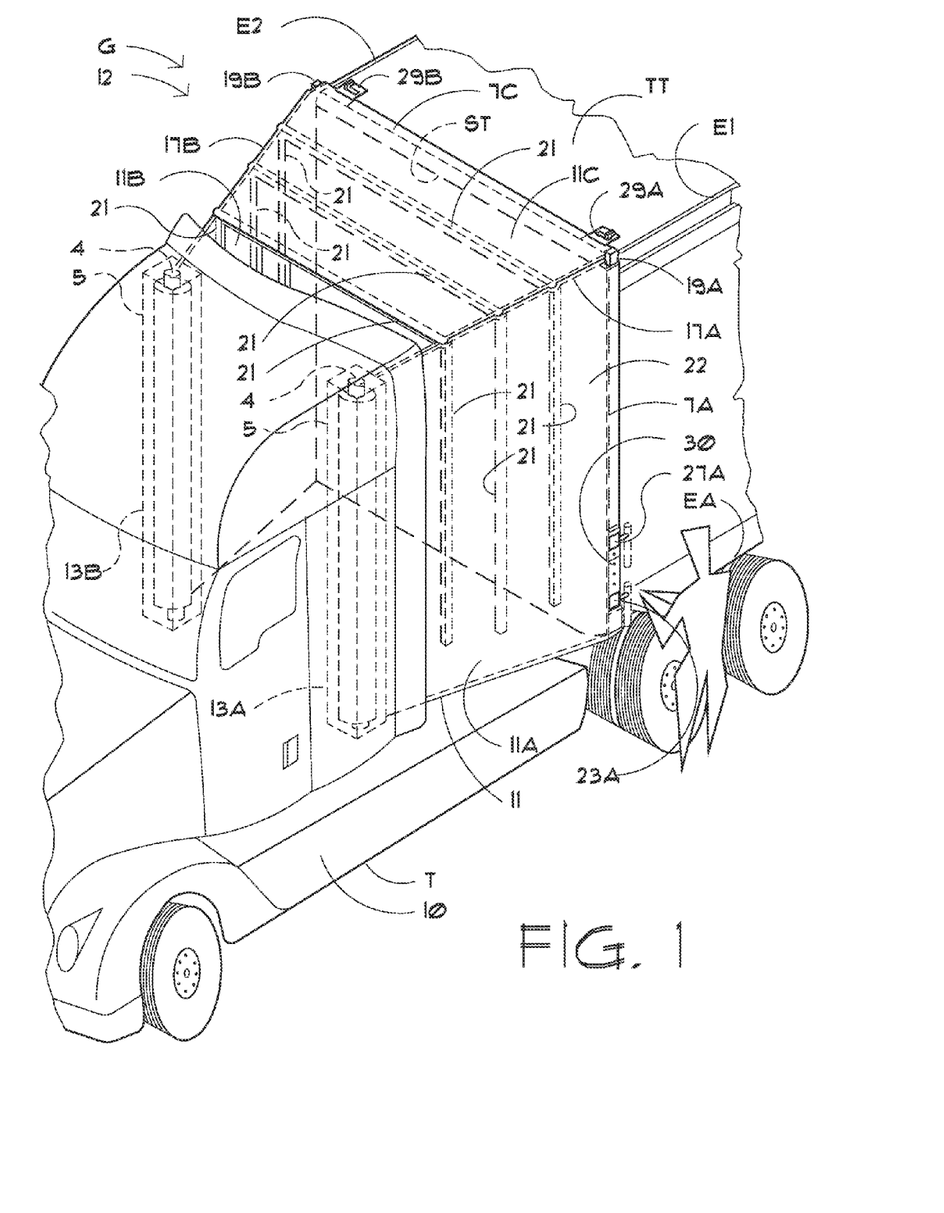
FIG. 1 is an axonometric elevational view of a device installed on a tractor-trailer combination truck.
Figure 2:
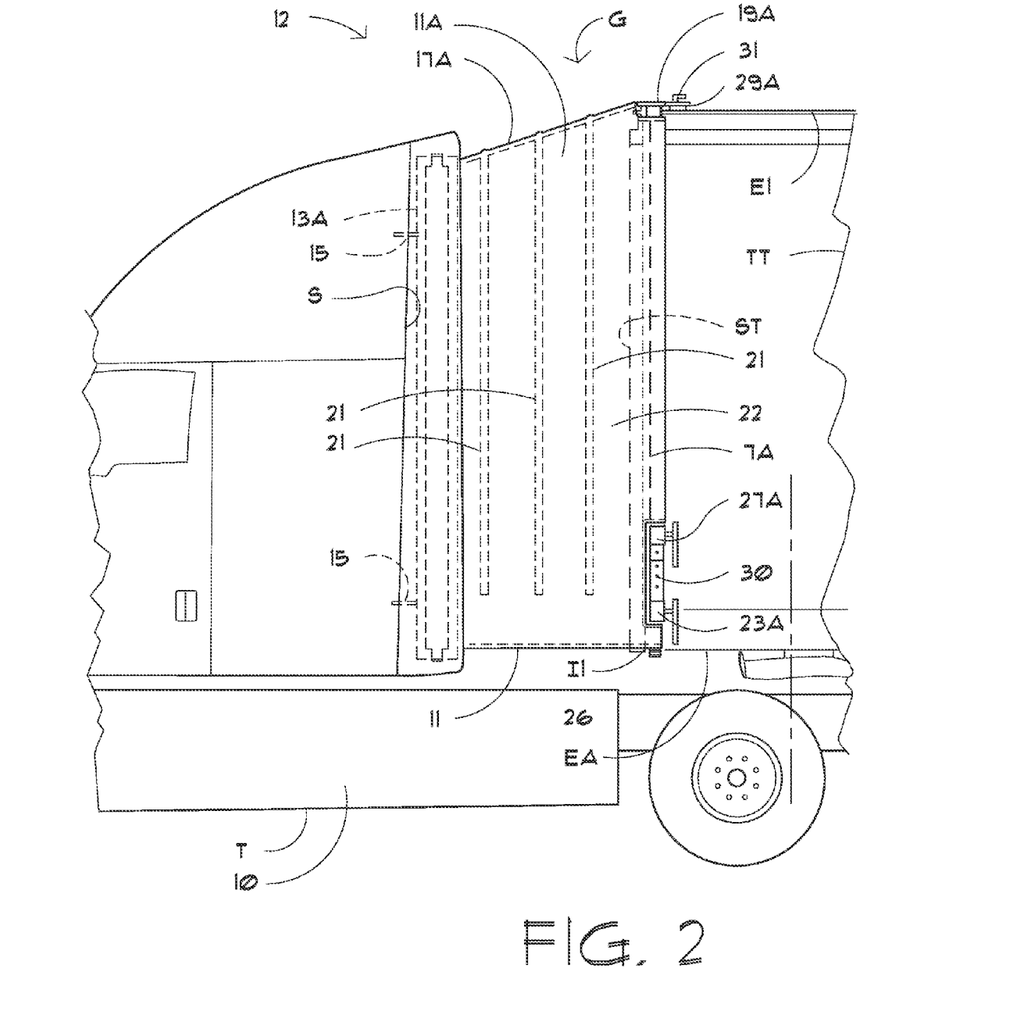
FIG. 2 is a right side elevational view of the device installed on the tractor-trailer combination truck.

FIG. 1 illustrates a conventional tractor-trailer combination truck 10 including a truck tractor "T" removably coupled to a trailer "TT." Referring to FIG. 2, the truck tractor "T" has a substantially flat or planar rearwardly facing surface "S" spaced apart from a substantially flat or planar forwardly facing surface "ST" of the trailer "TT." A gap "G" is defined between the rearwardly facing surface "S" of the tractor "T" and the forwardly facing surface "ST" of the trailer "TT."

A device 12 is positioned partially inside the gap "G" and extends between the tractor "T" and the trailer "TT." For ease of illustration, the device 12 is described as being for use with the conventional tractor-trailer combination truck 10. However, as is appreciated by those of ordinary skill in the art, the device 12 may be used with other ground vehicles, such as trains, buses, and the like.

Returning to FIG. 1, the device 12 includes an enclosure 11 that spans and substantially covers the gap "G." The enclosure 11 has a first side portion 11A, a second side portion 11B, and a top portion 11C. The first side portion 11A extends longitudinally along a first side portion of the gap "G." In the embodiment illustrated, the first side portion of the gap "G" is adjacent the driver side door of the tractor "T." The second side portion 11B extends longitudinally along a second side portion of the gap "G." In the embodiment illustrated, the second side portion of the gap "G" is adjacent the passenger side door of the tractor "T." The top portion 11C extends transversely between the first and second side portions 11B and 11C to cover the gap "G." In the embodiment illustrated, the top portion 11C is attached to the first side portion 11A by a first seam 17A and the top portion 11C is attached to the second side portion 11B by a second seam 17B. The top portion 11C extends from a rearward portion of each of the first and second side portions 11A and 11B toward forward portions 8A and 8B of the first and second side portions 11A and 11B but does not extend fully to the forward portions 8A and 8B of the first and second side portions 11A and 11B. Thus, depending upon the implementation details, a portion of the gap "G" adjacent the rearwardly facing surface "S" of the tractor "T" may not be covered by the top portion 11C.

The first side portion 11A, the second side portion 11B, and the top portion 11C are each constructed from a flexible web material, such as fabric 22. It may be desirable for the fabric 22 to have the following properties: low air porosity, high water resistance, high sun and UV resistance, high tear resistance, and high strength. Further, the fabric 22 may be lightweight and highly wind proof. However, it is understood that the first side portion 11A, the second side portion 11B, and/or the top portion 11C of the enclosure 11 may be constructed from alternate materials and/or fabrics that provide satisfactory performance but have properties and characteristics that vary substantially from those provide above.

Figure 1A:
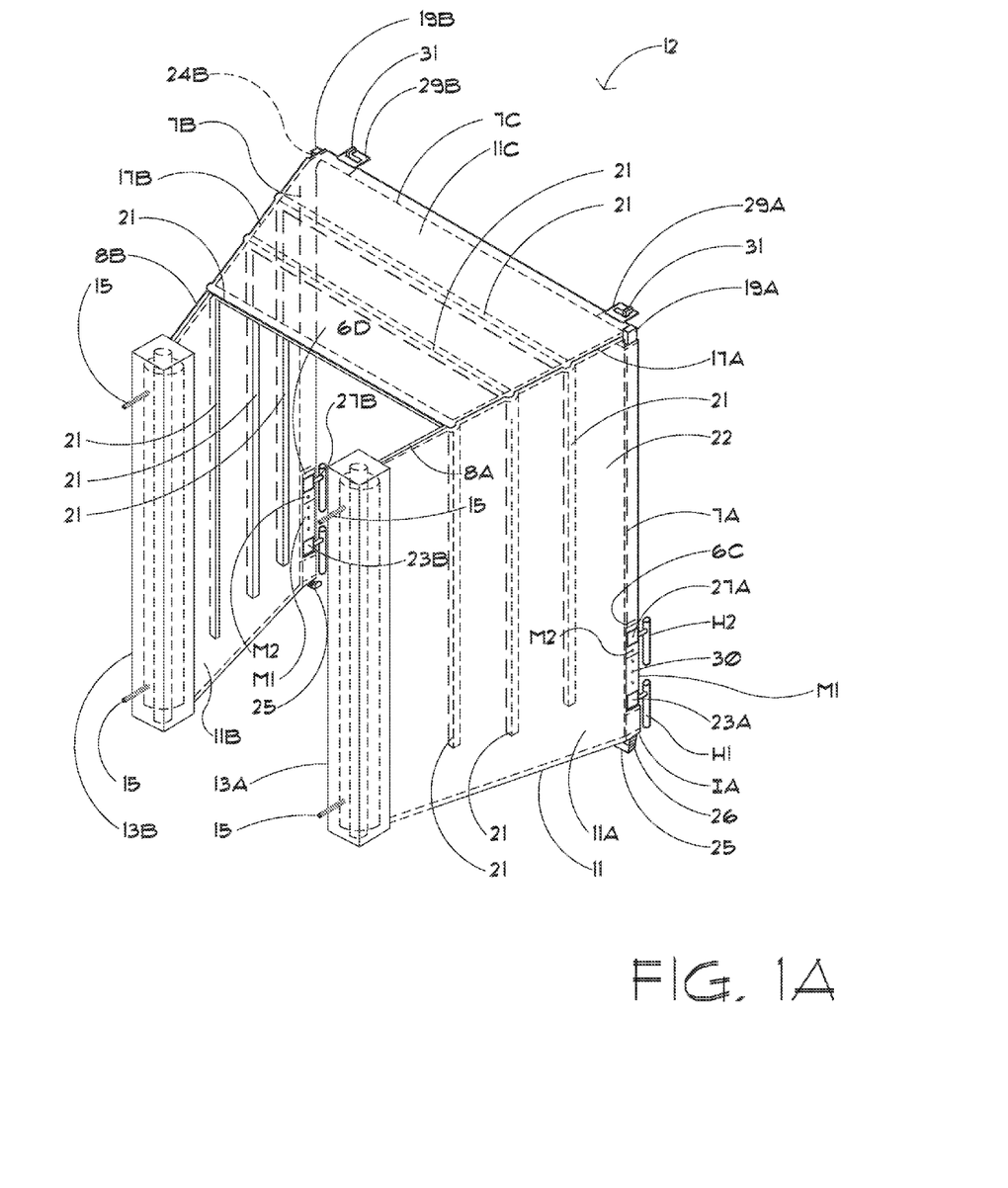
FIG. 1A is an axonometric elevational view of the device.

Turning to FIG. 1A, in the embodiment illustrated, the forward portion 8A of the first side portion 11A extends beyond the top portion 11C and the first seam 17A and the forward portion 8B of the second side portion 11B extends beyond the top portion 11C and the second seam 17B. A first loop or sleeve 7A is formed in a rearward portion of the first side portion 11A opposite the forward portion 8A and a second sleeve 7B is formed in a rearward portion of the second side portion 11B opposite the forward portion 8B. A rearward sleeve 7C is formed in a rear edge portion of the top portion 11C of the enclosure 11. The sleeves 7A, 7B, and 7C are each open at both ends. As may best be seen in FIG. 3A, the rearward sleeve 7C includes a first opening 6A spaced from the open end adjacent the first side portion 11A and a second opening 6B spaced from the open end adjacent the second side portion 11B. As may be seen in FIG. 2A, the first sleeve 7A includes an opening 6C and the second sleeve 7B includes an opening 6D.

The device 12 includes a first spool assembly 13A and a second spool assembly 13B. Each of the first and second spool assemblies 13A and 13B includes an upright recoiling and tensioning spool 4 rotatably mounted inside a housing 5 coupled the rearwardly facing surface "S" (see FIG. 3) of the tractor "T" (see FIG. 3) by mounting bolts 15. The spool 4 may be implemented using a metal spring-recoiling spring-tensioned spool. The forward portion 8A of the first side portion 11A of the enclosure 11 is wound or furled about the spool 4 of the first spool assembly 13A and the forward portion 8B of the second side portion 11B of the enclosure 11 is wound about the spool 4 of the second spool assembly 13B. The spools 4 of the first and second spool assemblies 13A and 13B are configured to recoil to wind the forward portions 8A and 8B, respectively, thereabout to impart tension in the first and second side portions 11A and 11B, respectively. The spools 4 of the first and second spool assemblies 13A and 13B operate separately and may impart different amounts of tension on the first and second side portions 11A and 11B, respectively. Further, different amounts of the forward portions 8A and 8B may be wound about each of the spools 4 of the first and second spool assemblies 13A and 13B, respectively.

Turning to FIG. 1A, the device 12 includes a first upright frame assembly 19A and a second upright frame assembly 19B. In the embodiment illustrated, the first frame assembly 19A is positioned inside the first sleeve 7A formed in the rearward portion of the first side portion 11A and the second frame assembly 19B is positioned inside the second sleeve 7B formed in the rearward portion of the second side portion 11B. Depending upon the implementation details, the sleeves 7A and 7B may be formed by seams stitched or otherwise formed in the fabric 22. Thus, the first and second upright frame assemblies 19A and 19B may be characterized as being seamed inside the first and second side portions 11A and 11B, respectively, of the fabric 22 of the enclosure 11. It is foreseen that the fabric 22 of the enclosure 11 may not require removal from the first and second spool assemblies 13A and 13B or the first and second frame assemblies 19A and 19B, except for maintenance or replacement. However, this is not a requirement. The first and second upright frame assemblies 19A and 19B may be constructed from metal or any other suitable material.

Figure 6:
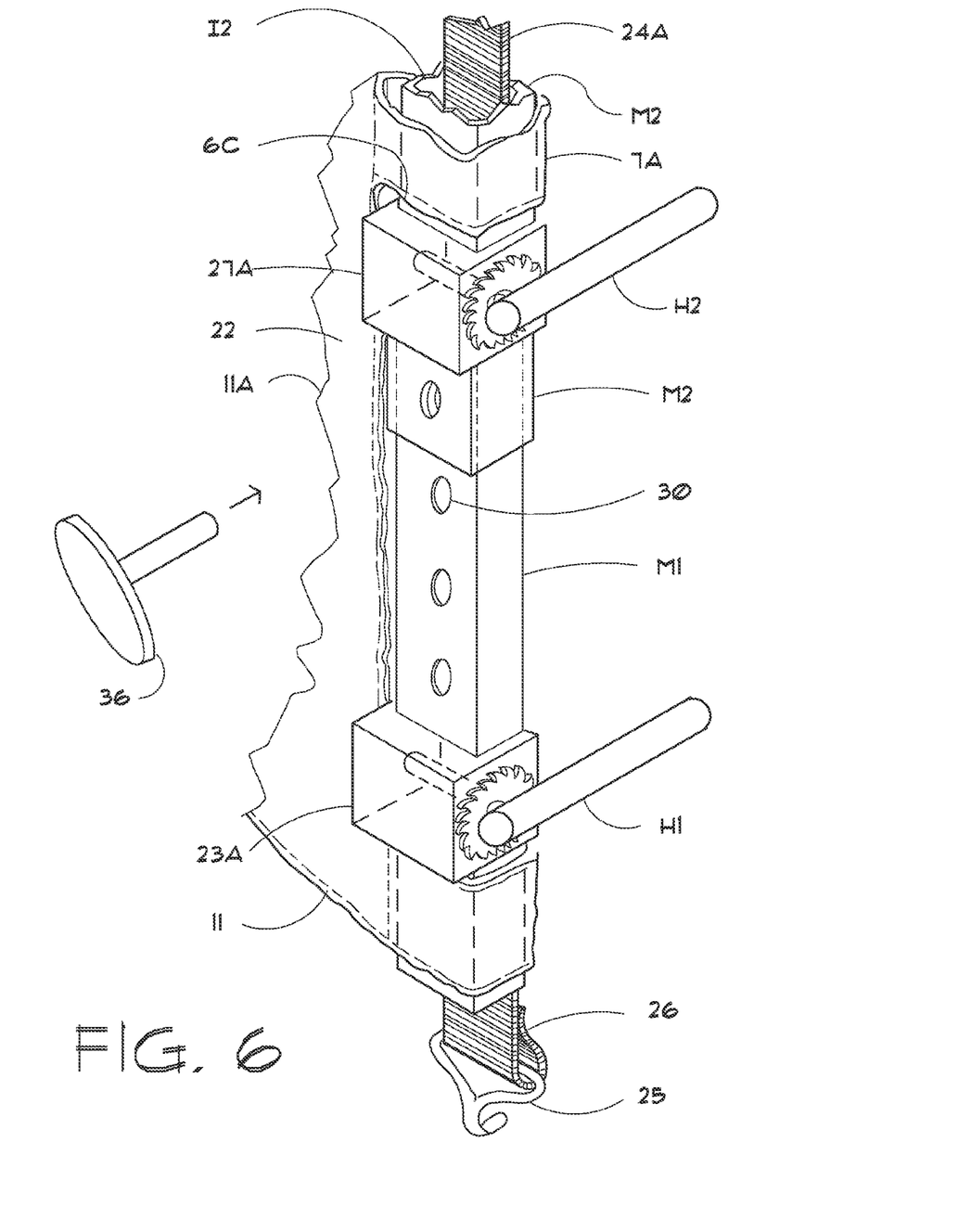
FIG. 6 is an enlarged partial view of a lower portion of a first upright frame assembly and a portion of an enclosure of the device of FIG. 1.

Each of the first and second upright frame assemblies 19A and 19B may include a lower tube-shaped member "M1" and an upper tube-shaped member "M2." The lower and upper members "M1" and "M2" may each be open at both ends. An internal channel "I1" extends between the open ends of the lower member "M1" and an internal channel "I2" extends between the open ends of the upper member "M2." The lower and upper members "M1" and "M2" are configured telescope to adjust the length of the first and second upright frame assemblies 19A and 19B. In the embodiment illustrated, an upper portion of the lower member "M1" is received inside a lower portion of the upper member "M2." In the embodiment illustrated, the first and second frame assemblies 19A and 19B are adjustable in vertical length with pins 36 (see FIG. 6) configured to be received inside spaced slotted holes 30 (formed in the lower and upper members "M1" and "M2"). Referring to FIG. 6, each of the pins 36 may be implemented as a quick-release pin, such as a self-locking quick-release T-pin. The length of each of the first and second upright frame assemblies 19A and 19B may be adjusted by aligning a selected one of the holes 30 formed in the upper member "M2" with a selected one of the holes 30 formed in the lower member "M1" and inserting a pin 36 through the selected ones of the holes 30 such that the lengths of each of the first and second upright frame assemblies 19A and 19B corresponds to the vertical height dimension of the trailer "TT." It is also within the scope of the present description to provide alternate means of lengthening (or shortening) the first and second frame assemblies 19A and 19B or to use alternate materials or structures to construct the first and second frame assemblies 19A and 19B.

With respect to the first side portion 11A of the enclosure 11, to provide access, the holes 30 may be positioned inside the opening 6C of the sleeve 7A in which the first frame assembly 19A is at least partially received. With respect to the second side portion 11B of the enclosure 11, to provide access, the holes 30 may be positioned inside the opening 6D of the sleeve 7B in which the second frame assembly 19B is at least partially received.

Returning to FIG. 1A, the device 12 includes a plurality of stiffeners or battens 21 coupled to each of the first side portion 11A, the second side portion 11B, and the top portion 11C of the enclosure 11. Each of the battens 21 may be implemented as an engineered composite batten. Each of the battens 21 is coupled to one of the first side portion 11A, the second side portion 11B, or the top portion 11C of the enclosure 11. In the embodiment illustrated, each of the battens 21 is seamed in the fabric 22 of the enclosure 11 (e.g., resides inside a sleeve formed in the fabric 22) along one of the first side portion 11A, the second side portion 11B, or the top portion 11C.

Figure 2A:
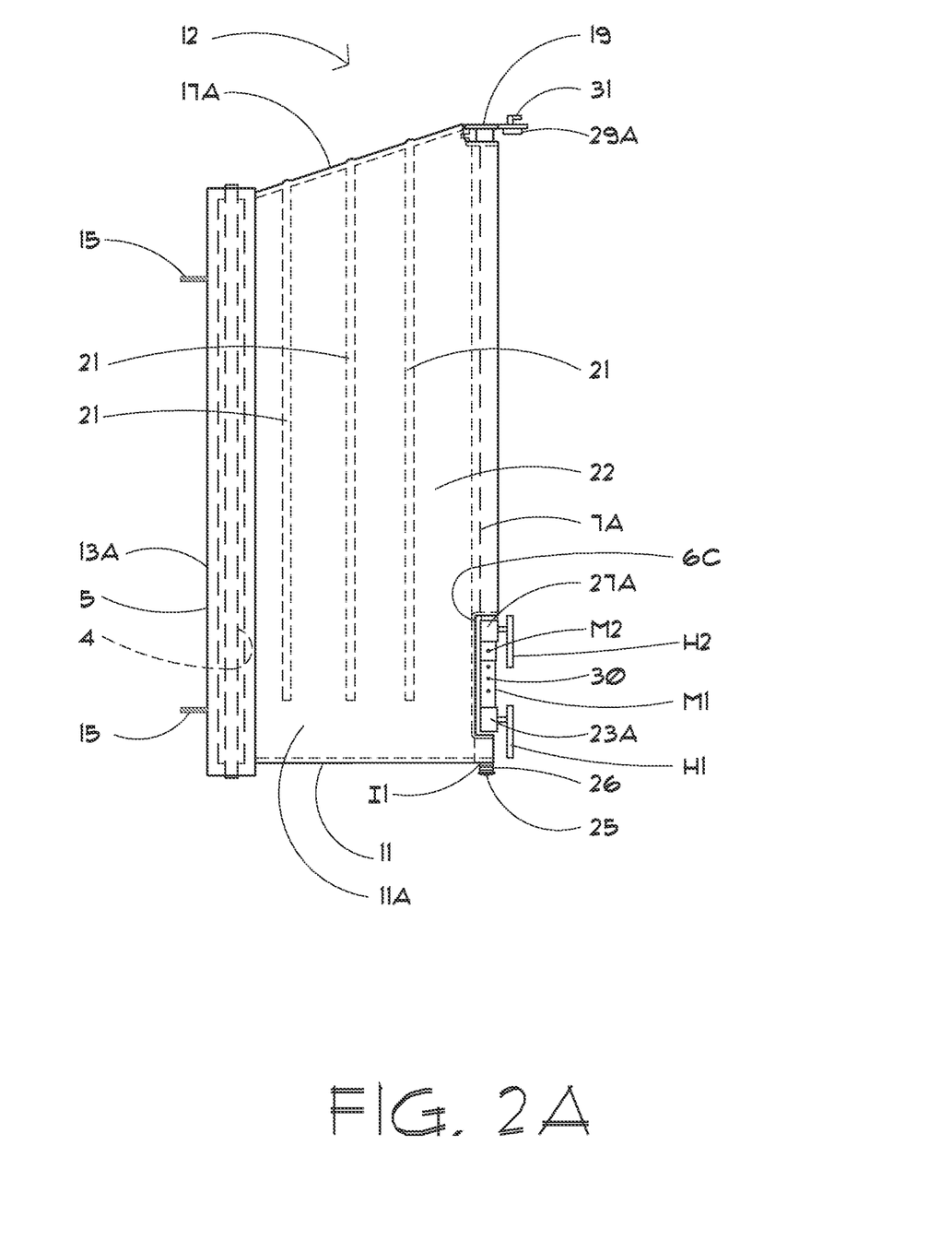
FIG. 2A is a right side elevational view of the device.

The shape of the enclosure 11 may be defined by the seams 17A and 17B, and the first and second upright frame assemblies 19A and 19B, and sustained by the battens 21 and tension provided by the spools 4 of the first and second spool assemblies 13A and 13B, thereby providing a taunt outer surface along the outside of the enclosure 11 over which air can flow, routing the air flow over and around the forwardly facing surface "ST" of the trailer "TT" to reduce drag as the tractor-trailer combination truck 10 travels forwardly. In FIG. 2 and FIG. 2A, the seams 17A and 17B, the battens 21, the spools 4 of the first and second spool assemblies 13A and 13B, and the first and second frame assemblies 19A and 19B configure the enclosure 11 to correspond with the general dimensions of the rear portion of the tractor "T" and the forward portion of the trailer "TT."

Turning to FIG. 1A, the first and second frame assemblies 19A and 19B are attached to first and second side portions of the trailer "TT," respectively. In the embodiment illustrated, each of the first and second frame assemblies 19A and 19B is coupled to the trailer "TT" by a hook 25 coupled to a lower web strap 26. In the embodiment illustrated in FIG. 2, the first frame assembly 19A is coupled to an edge "EA" of the first side portion of the trailer "TT," by the hook 25 coupled to the lower web strap 26. Similarly, the second frame assembly 19B is coupled to an edge (not shown) of the second side portion of the trailer "TT," by the hook 25 coupled to the lower web strap 26. The first frame assembly 19A is attached to the lower web strap 26 by a lower ratchet 23A, which is configured to tighten the lower web strap 26 causing the hook 25 to bear against the edge "EA" of the first side portion of the truck trailer "TT." The second frame assembly 19B is attached to the lower web strap 26 by a lower ratchet 23B, which is configured to tighten the lower web strap 26 causing the hook 25 to bear against the edge (not shown) of the second side portion of the truck trailer "TT."

Turning to FIG. 6, each of the ratchets 23A and 23B includes a handle "H1" that is operable by a user to control the tension applied by the ratchet to the lower web strap 26. Each of the ratchets 23A and 23B may be selectively locked and unlocked. When locked, each of the ratchets 23A and 23B grips the lower web strap 26 engaged with the ratchet. When unlocked, each of the ratchets 23A and 23B releases its grip on the lower web strap 26 engaged with the ratchet. The ratchet 23A may be positioned inside the opening 6C of the sleeve 7A in which the first frame assembly 19A is at least partially received. Turning to FIG. 1A, the ratchet 23B may be positioned inside the opening 6D of the sleeve 7B in which the second frame assembly 19B is at least partially received.

Figure 3:
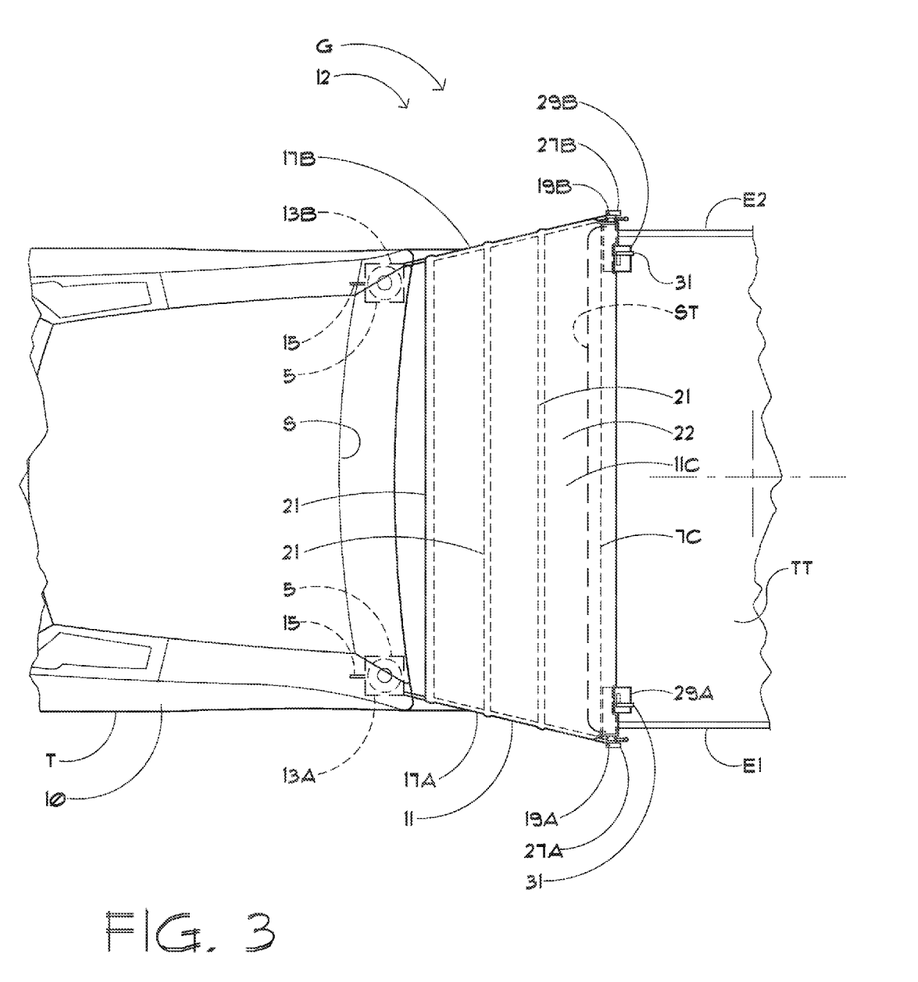
FIG. 3 is a top plan view of the device installed on the tractor-trailer combination truck.
Figure 3A:
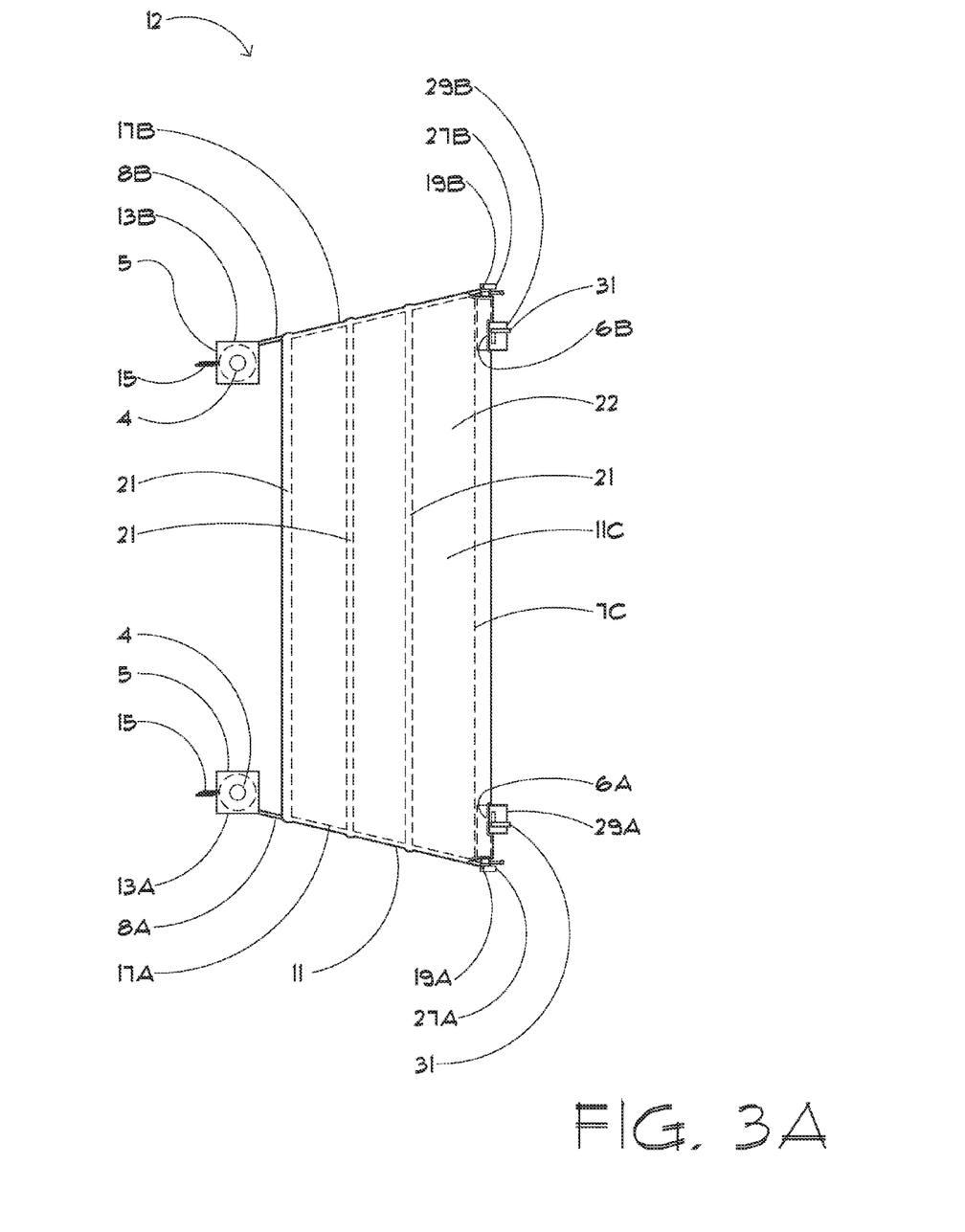
FIG. 3A is a top plan view of the device.
Figure 5:
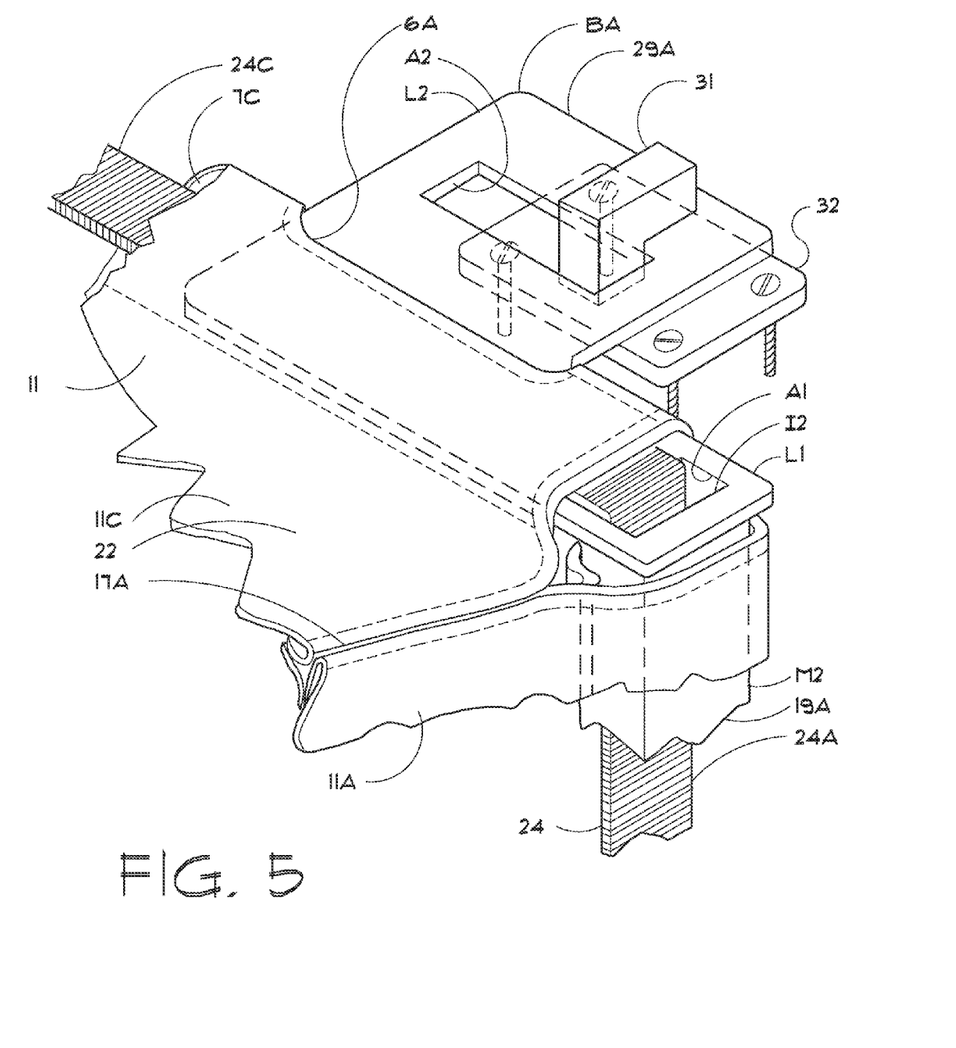
FIG. 5 is an enlarged partial view of a twist latch attachment at the top of an upright frame assembly.

Turning to FIG. 3A, the first opening 6A in the rearward sleeve 7C is configured to receive a portion of a first bracket "BA" and the second opening 6B in the rearward sleeve 7C is configured to receive a portion of a second bracket "BB." Referring to FIG. 5, each of the brackets "BA" and "BB" may be generally L-shaped with a first leg portion "L1" positioned partially inside the rearward sleeve 7C. An aperture "A1" is formed in a distal portion of the first leg portion "L1." The distal portion of the first leg portion "L1" may extend outwardly from an open end portion of the rearward sleeve 7C. A second leg portion "L2" of each of the first and second brackets "BA" and "BB" extends rearwardly away from the enclosure 11. The second leg portion "L2" includes an aperture "A2" accessible from outside the rearward sleeve 7C.

As may best be seen in FIG. 5, the device 12 includes an overtop web strap 24 having a first end portion 24A, a second end portion 24B (see FIG. 1A), and an intermediate portion 24C. The second end portion 24B is opposite the first end portion 24A and the intermediate portion 24C is located between the first and second end portions 24A and 24B. The first end portion 24A is positioned inside the internal channel "I2" of the upper member "M2" of the first frame assembly 19A, and extends upwardly through the aperture "A1" formed in the first leg portion "L1" of the first bracket "BA." The intermediate portion 24C is disposed inside the rearward sleeve 7C formed in the rearward portion of the top portion 11C of the enclosure 11. The intermediate portion 24C extends from the aperture "A1" across the top of the first leg portion "L1" of the first bracket "BA" through the rearward sleeve 7C and across the top of the first leg portion "L1" of the second bracket "BB." The second end portion 24B (see FIG. 1A) extends downwardly through the aperture "A1" formed in the first leg portion "L1" of the second bracket "BB" and into the internal channel "I2" of the upper member "M2" of the second frame assembly 19B. The overtop web strap 24 is slidable as a unit relative to the enclosure 11 inside the rearward sleeve 7C, the apertures "A1" of the first and second brackets "BA" and "BB," the internal channel "I2" of the upper member "M2" of the first frame assembly 19A, and the internal channel "I2" of the upper member "M2" of the second frame assembly 19B.

Ratchets 27A and 27B are configured to selectively tighten and loosen the overtop web strap 24. The first ratchet 27A is coupled to the first frame assembly 19A and the second ratchet 27B is coupled to the second frame assembly 19B. A portion of the first end portion 24A of the overtop web strap 24 is entwined about the first ratchet 27A, which is configured to selectively tighten and loosen the overtop web strap 24. A portion of the second end portion 24B of the overtop web strap 24 is entwined about the second ratchet 27B, which is configured to selectively tighten and loosen the overtop web strap 24. Each of the ratchets 27A and 27B includes a handle "H2" illustrated in FIG. 1A that is operable by a user to control the tension applied by the ratchet to the overtop web strap 24. Each of the ratchets 27A and 27B may be selectively locked and unlocked. When locked, each of the ratchets 27A and 27B grips the overtop web strap 24. When unlocked, each of the ratchets 27A and 27B releases its grip on the overtop web strap 24. The ratchet 27A may be positioned inside the opening 6C of the sleeve 7A in which the first frame assembly 19A is at least partially received. The ratchet 27B may be positioned inside the opening 6D of the sleeve 7B in which the second frame assembly 19B is at least partially received.

Twist latches 29A and 29B are coupled to a top portion of the trailer "TT" adjacent to the first side portion of the trailer "TT" and the second side portion of the trailer "TT," respectively. Each of the twist latches 29A and 29B includes a bracket 32 configured to be coupled to the top portion of trailer "TT." By way of a non-limiting example, the bracket 32 may be coupled to the top portion of trailer "TT" by fasteners, such as bolts, screws, and the like. Each of the twist latches 29A and 29B also includes a rotatable key member 31 configured to be received inside one of the apertures "A2" formed in the second leg portions "L2" of the first and second brackets "BA" and "BB." The rotatable key member 31 is selectively rotatable between a locked position (illustrated in FIGS. 1, 1A, 2, 2A, 3, 3A, 4, 4A, and 5) and an unlocked position (not shown). By way of a non-limiting example, the rotatable key member 31 may be implemented as a metal J-hook.

When the rotatable key member 31 is in the unlocked position, the rotatable key member 31 may pass through the aperture "A2." Thus, in this position, the rotatable key member 31 may be received inside or removed from the aperture "A2," which functions a keyway for the rotatable key member 31. When the rotatable key member 31 of the twist latch 29A is received inside the aperture "A2" of the bracket "BA," the rotatable key member 31 may be rotated to the locked position to couple the bracket 32 to the bracket "BA." When the rotatable key member 31 of the twist latch 29A is in the locked position, the rotatable key member 31 may be rotated to the unlocked position allowing the bracket 32 to be disconnected from the bracket "BA." Similarly, when the rotatable key member 31 of the twist latch 29B is received inside the aperture "A2" of the bracket "BB," the rotatable key member 31 may be rotated to the locked position to couple the bracket 32 to the bracket "BB." When the rotatable key member 31 of the twist latch 29B is in the locked position, the rotatable key member 31 may be rotated to the unlocked position allowing the bracket 32 to be disconnected from the bracket "BB." Thus, the of the twist latches 29A and 29B may be used to selectively couple and uncouple the enclosure 11 to the trailer "TT."

The first and second frame assemblies 19A and 19B may be easily unattached by unlocking ratchets 23A and 23B to release the tension on the lower web straps 26, unlocking ratchets 27A and 27B to release the tension on the overtop web strap 24, and unlocking twist latches 29A and 29B before the trailer "TT" is disconnected from the tractor "T." It is foreseen that the first and second frame assemblies 19A and 19B and the first and second spool assemblies 13A and 13B will not need to be removed from the enclosure 11, except for maintenance or replacement. However, this is not a requirement and the embodiments in which the first and second frame assemblies 19A and 19B and the first and second spool assemblies 13A and 13B are removed from the enclosure 11 for other reasons are within the scope of the present teachings. As is appreciated by those of ordinary skill in the art, alternate means, materials, or structures may be used to couple the first and second frame assemblies 19A and 19B to the trailer "TT" and such alternate means, materials, or structures are within the scope of the present teachings.

The construction of the enclosure 11 and attachment details described for the embodiment depicted in the figures may be configured to allow for rapid and secure attachment of the enclosure 11 to the trailer "TT" while hitched to tractor "T" during use. However, it is also understood that a wide variation of the construction, mounting details, and attachment details will not significantly affect the performance of the device 12.

In the embodiment illustrated in the drawings, the first frame assembly 19A is attached to the top portion of the trailer "TT" adjacent an upper edge "E1" of the first side portion of the trailer "TT" by the first twist latch 29A and the second frame assembly 19B is attached to the top portion of the trailer "TT" adjacent an upper an edge "E2" of the second side portion of the trailer "TT" by the second twist latch 29B. The first frame assembly 19A is also attached to the lower edge "EA" of the first side portion of the trailer "TT" by the hook 25 and the lower web strap 26, which may be selectively tightened (or loosened) by the handle "H1" of the ratchet 23A. The second frame assembly 19B is attached to the lower edge (not shown) of the second side portion of the trailer "TT" by the hook 25 and the lower web strap 26, which may be selectively tightened (or loosened) by the handle "H1" of the ratchet 23B. The first and second frame assemblies 19A and 19B are also attached to the trailer "TT" by the overtop web strap 24 that is selectively tightened (or loosened) by the handles "H2" of the ratchets 27A and 27B. It is also within the scope of the present teachings to provide alternate means or structures for attaching the first and second frame assemblies 19A and 19B to the trailer "TT."

Through application of ordinary skill to the present teachings other shapes, methods, and materials may be used to construct the enclosure 11, the first and second frame assemblies 19A and 19B, and the attachment mechanisms for use with non-rectangularly shaped tractor-trailer combination trucks or other road vehicles.

The construction of the enclosure 11 and the attachment details of the first and second frame assemblies 19A and 19B described for the embodiment illustrated will allow for rapid and secure attachment of the enclosure 11 to the forward portion of the trailer "TT," as well as the rapid removal of the enclosure 11 from the forward portion of the trailer "TT." It is foreseen that the device 12 will be unattached from the trailer "TT" when the trailer TT is not in use. However, this is not a requirement. It is foreseen that the first and second spool assemblies 13A and 13B (which include the spools 4, respectively) need not be removed from the rearwardly facing surface "S" of the truck tractor "T," except for maintenance or replacement. However, this is also not a requirement.

In FIG. 3 and FIG. 3A, the shape of the enclosure 11 defined by the seams 17A and 17B, battens 21, the first spool assembly 13A, the second spool assembly 13B, the first frame assembly 19A, and the second frame assembly 19B corresponds generally with the dimensions of the tractor "T" and the trailer "TT" at the end portions of the gap "G."

The enclosure 11 is configured to be adjustable along its transverse dimension to span the gap "G" transversely. This may be achieved by constructing the top portion 11C of the enclosure 11 from an amount of fabric 22 sufficient to extend across the greatest width (or transverse dimension) of the trailer "TT." For narrower trailers (having a shorter transverse dimension), the fabric 22 may simply gather together (and optionally form folds) when the overtop web strap 24 is tightened by the ratchets 27A and 27B. As is appreciated by those of ordinary skill in the art, alternate means and structures for adjusting the transverse dimension of the enclosure 11 may be used, including means and structures that also attach the first and second frame assemblies 19A and 19B to the trailer "TT."

Figure 4:
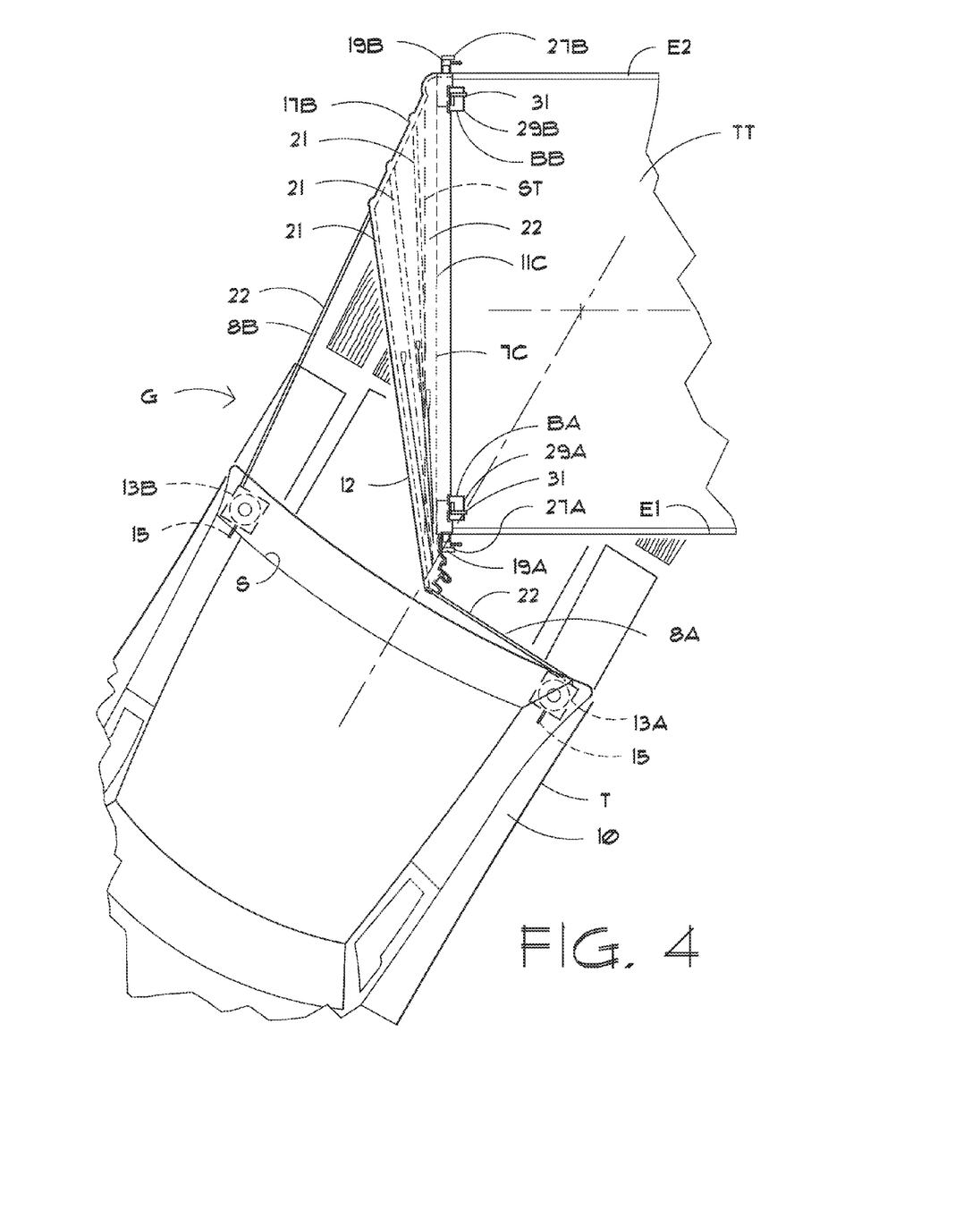
FIG. 4 is a top plan view of the device installed on the tractor-trailer combination truck when the tractor is turning.
Figure 4A:
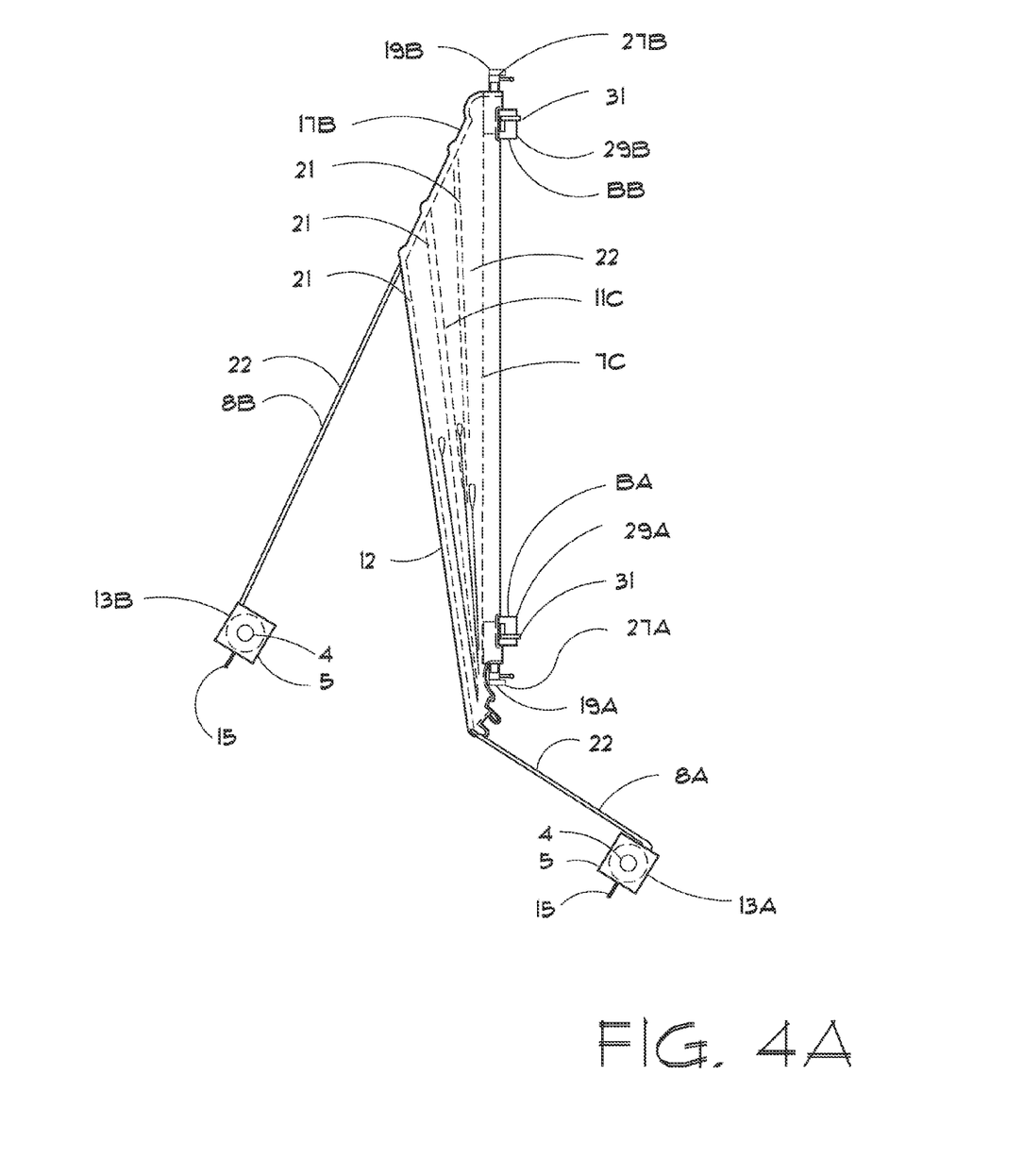
FIG. 4A is a top plan view of the device when the tractor is turning.

FIG. 4 and FIG. 4A illustrate the truck tractor "T" pivoted relative to the trailer "TT" as occurs when a tractor-trailer combination truck 10 turns during travel. As discussed above, the first and second frame assemblies 19A and 19B are attached to the edges of the first and second side portions of truck trailer "TT," respectively, the forward portion 8A (see FIG. 1A) of the first side portion 11A of the enclosure 11 is attached to the recoiling and tensioning spool 4 of the first spool assembly 13A mounted (permanently or removably) to the rearward facing surface "S" of the truck tractor "T," and the forward portion 8B (see FIG. 1A) of the second side portion 11B of the enclosure 11 is attached to the recoiling and tensioning spool 4 of the second spool assembly 13B mounted (permanently or removably) to the rearward facing surface "S" of the truck tractor "T." When the truck "T" turns, the enclosure 11 is generally compressed on the inside radius side of the turning truck and tensioned on the outside radius side of the turning truck. When the truck "T" turns, a portion of the forward portion 8A may be furled about or unfurled from the spool 4 of the first spool assembly 13A as required to accommodate the turn. Further, a portion of the forward portion 8B may be furled about or unfurled from the spool 4 of the second spool assembly 13B as also required to accommodate the turn.

Thus, in the embodiment illustrated in FIG. 4 and FIG. 4A, when the tractor-trailer combination truck 10 makes a left hand turn, a portion of the fabric 22 of the forward portion 8B is unfurled from the spool 4 of the second spool assembly 13B to easily allow an unhindered turning radius of the tractor-trailer combination truck 10 or other road vehicle during the turning movement. At the same time, a portion of the fabric 22 of the forward portion 8A is furled about the spool 4 of the first spool assembly 13A. When the turning is complete, a portion of the fabric 22 of the forward portion 8B is re-furled about the spool 4 of the second spool assembly 13B and a portion of the fabric 22 of the forward portion 8A is unfurled about the spool 4 of the first spool assembly 13A. When the tractor-trailer combination truck 10 makes a right hand turn, a portion of the fabric 22 of the forward portion 8B is furled about the spool 4 of the second spool assembly 13B and, and a portion of the fabric 22 of the forward portion 8A is unfurled from the spool 4 of the first spool assembly 13A to accommodate the turn. A sufficient length of fabric 22 may be furled and stored around the spools 4 to accommodate all turning angles available to the tractor "T."

The enclosure 11 is configured to distort in response to the turn. The battens 21 are configured to bend as necessary in the distorted enclosure 11 during the turning movement. The battens 21 may be implemented as flexible or deformable engineered composite members seamed into the fabric 22 of the enclosure 11 configured to return to their original shape after the turn is completed. Optionally, other stiffening and flexing means or materials may be seamed into the fabric 22 of the enclosure 11 in addition to or in place of the battens 21. It is foreseen that the battens 21 may not need to be removed from the enclosure 11, except for maintenance or replacement. However, this is not a requirement and embodiments in which the battens 21 are removed for other reasons are within the scope of the present teachings.

As discussed above and illustrated in FIG. 5, the first and second frame assemblies 19A and 19B are secured to the top portion of the trailer "TT" by the twist latches 29A and 29B, which include the rotatable key members 31. The twist latches 29A and 29B allow the frame assemblies 19A and 19B to be securely attached adjacent to the upper edges "E1" and "E2," respectively, of the trailer "TT." The rotatable key members 31 and brackets 32 may be permanently or removably mounted to the top portion of the trailer "TT." The overtop web strap 24 may be implemented as a continuous strap positioned inside the rearward sleeve 7C and the internal channels "I2" of the upper members "M2" of the first and second frame assemblies 19A and 19B to allow continuous attachment tensioning around the first and second side portions and the top portion of the trailer "TT" by the ratchets 27A and 27B. It is also within the scope of the present teachings to provide alternate lengthening and attachment means or materials for attaching the first and second frame assemblies 19A and 19B to the truck trailer "TT."

During travel at highway speeds and lesser speeds, the enclosure 11 provides a generally smooth air-flow surface which substantially reduces eddy currents and turbulent air flow as the conventional tractor-trailer combination truck 10 moves through the air. Fuel consumption and air pollution may therefore be reduced with the easy-to-use and cost effective device.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Other modifications and changes may be used in the design and manufacturing of the apparatus of the present invention without departing from the spirit and scope of the accompanying claims.

Accordingly, the invention is not limited except as by the appended claims.

The invention claimed is:

1. A device for use with a trailer coupled to a tractor, the trailer comprising a forward trailer portion, a first trailer side portion extending away from the forward trailer portion, and a second trailer side portion extending away from the forward trailer portion, the second trailer side portion being opposite the first trailer side portion, the tractor comprising a rear portion, a gap being defined between the rear portion of the tractor and the forward trailer portion, the device comprising:

an enclosure having a first side portion, a second side portion opposite the first side portion, and a top portion extending between the first and second side portions, the top portion extending from a rearward portion of each of the first and second side portions toward a forward portion of each of the first and second side portions;

a first recoiling spool assembly configured to be coupled to the rear portion of the tractor, the first recoiling spool assembly comprising a rotatable spool, the forward portion of the first side portion of the enclosure being wound around the spool of the first recoiling spool assembly, the first recoiling spool assembly being configured to wind the forward portion of the first side portion of the enclosure about the spool to thereby maintain tension in the first side portion of the enclosure;

a second recoiling spool assembly configured to be coupled to the rear portion of the tractor, the second recoiling spool assembly comprising a rotatable spool, the forward portion of the second side portion of the enclosure being wound around the spool of the second recoiling spool assembly, the second recoiling spool assembly being configured to wind the forward portion of the second side portion of the enclosure about the spool to thereby maintain tension in the second side portion of the enclosure; and a coupling assembly configured to couple a rearward portion of the top portion of the enclosure, the rearward portion of the first side portion of the enclosure, and the rearward portion of the second side portion of the enclosure to the trailer, the first side portion of the enclosure extending from the first recoiling spool assembly across the gap toward the first trailer side portion of the trailer, the second side portion of the enclosure extending from the second recoiling spool assembly across the gap toward the second trailer side portion of the trailer, and the top portion of the enclosure covering at least a portion of the gap defined between the tractor and the trailer.

2. The device of claim 1, wherein the coupling assembly comprises:
a first upright frame assembly configured to be coupled to the trailer adjacent to the first trailer side portion of the trailer, the first upright frame assembly being coupled to the rearward portion of the first side portion of the enclosure; and
a second upright frame assembly configured to be coupled to the trailer adjacent to the second trailer side portion of the trailer, the second upright frame assembly being coupled to the rearward portion of the second side portion of the enclosure.

3. The device of claim 2 for use with the trailer further including a top trailer portion extending between the first and second trailer side portions, wherein the coupling assembly further comprises:
at least one connector attached to the top portion of the enclosure, the at least one connector being configured to be coupled to the top trailer portion of the trailer, and when coupled thereto to couple the top portion of the enclosure to the top trailer portion of the trailer.

4. The device of claim 1 for use with the trailer further including a top trailer portion extending between the first and second trailer side portions, wherein the coupling assembly comprises a strap having a first end portion coupled to the first trailer side portion of the trailer and a second end portion coupled to the second trailer side portion of the trailer, and
a transverse sleeve is formed in the rearward portion of the top portion of the enclosure, the strap extending through the transverse sleeve to draw the rearward portion of the top portion of the enclosure toward the top trailer portion of the trailer.

5. The device of claim 4, further comprising at least one ratchet coupled to the strap and configured to impart tension into the strap to draw the rearward portion of the top portion of the enclosure toward the top trailer portion of the trailer.

6. The device of claim 4, wherein a first upright sleeve is formed in the rearward portion of the first side portion of the enclosure,
a second upright sleeve is formed in the rearward portion of the second side portion of the enclosure, and
the strap extends though the first upright sleeve, the transverse sleeve, and the second upright sleeve to at least partially couple to the trailer the rearward portion of the top portion of the enclosure, the rearward portion of the first side portion of the enclosure, and the rearward portion of the second side portion of the enclosure.

7. The device of claim 1 for use with the trailer further including a top trailer portion extending between the first and second trailer side portions, wherein a transverse sleeve is formed in the rearward portion of the top portion of the enclosure,
a first upright sleeve is formed in the rearward portion of the first side portion of the enclosure,
a second upright sleeve is formed in the rearward portion of the second side portion of the enclosure, and
the coupling assembly further comprises:
a first upright member positioned inside the first upright sleeve, the first upright member comprising a first open ended upright channel;
a second upright member positioned inside the second upright sleeve, the second upright member comprising a second open ended upright channel; and
an upper strap having a first end portion coupled to the first trailer side portion of the trailer and a second end portion coupled to the second trailer side portion of the trailer, the upper strap extending though the first open ended upright channel of the first upright member, the transverse sleeve, and the second open ended upright channel of the second upright member to at least partially couple to the trailer the rearward portion of the top portion of the enclosure, the rearward portion of the first side portion of the enclosure, and the rearward portion of the second side portion of the enclosure.

8. The device of claim 7, wherein the coupling assembly further comprises:
a first ratchet coupled to the first upright member, the first end portion of the upper strap being entwined about the first ratchet, the first ratchet being configured to impart tension into the upper strap;
a second ratchet coupled to the second upright member, the second end portion of the upper strap being entwined about the second ratchet, the second ratchet being configured to impart tension into the upper strap;
a third upright member positioned inside the first upright sleeve, the third upright member comprising a third open ended upright channel;
a fourth upright member positioned inside the second upright sleeve, the fourth upright member comprising a fourth open ended upright channel;
a first lower strap having a first end portion opposite a second end portion, the first end portion of the first lower strap being coupled to a lower portion of the first trailer side portion of the trailer, the second end portion of the first lower strap extending upwardly into the third open ended upright channel of the third upright member;
a second lower strap having a first end portion opposite a second end portion, the first end portion of the second lower strap being coupled to a lower portion of the second trailer side portion of the trailer, the second end portion of the second lower strap extending upwardly into the fourth open ended upright channel of the fourth upright member;
a third ratchet coupled to the third upright member, the second end portion of the first lower strap being entwined about the third ratchet, the third ratchet being configured to impart tension in the first lower strap; and
a fourth ratchet coupled to the fourth upright member, the second end portion of the second lower strap being entwined about the fourth ratchet, the fourth ratchet being configured to impart tension in the second lower strap.

9. The device of claim 8, wherein an upper portion of the third upright member is slidably received inside a lower portion of the first upright member, and an upper portion of the fourth upright member is slidably received inside a lower portion of the second upright member.

10. The device of claim 9, wherein the upper portion of the third upright member is couplable to the lower portion of the first upright member when received therein, and the upper portion of the fourth upright member is couplable to the lower portion of the second upright member when received therein.

11. The device of claim 8, wherein the first end portion of the first lower strap is coupled to the lower portion of the first trailer side portion of the trailer by a first hook, and the first end portion of the second lower strap is coupled to the lower portion of the second trailer side portion of the trailer by a second hook.

12. The device of claim 1 for use with the trailer including a top trailer portion extending between the first and second trailer side portions of the trailer, wherein the coupling assembly further comprises:

a strap having a first end portion coupled to the first trailer side portion of the trailer and a second end portion coupled to the second trailer side portion of the trailer;

a first ratchet adjacent the first trailer side portion of the trailer coupled to the first end portion of the strap;

a second ratchet adjacent the second trailer side portion of the trailer coupled to the second end portion of the strap, the first and second ratchets each being configured to impart tension into the strap; and a transverse sleeve is formed in the rearward portion of the top portion of the enclosure, the strap extending through the transverse sleeve.

13. The device of claim 1 for use with the trailer including a top trailer portion extending between the first and second trailer side portions, wherein the coupling assembly comprises:

a first upright frame assembly configured to be coupled to a lower edge portion of the first trailer side portion of the trailer, the first upright frame assembly being coupled to the rearward portion of the first side portion of the enclosure, the first upright frame assembly comprising an upright member having an upright open-ended internal channel formed therein;

a second upright frame assembly configured to be coupled to a lower edge portion of the second trailer side portion of the trailer, the second upright frame assembly being coupled to the rearward portion of the second side portion of the enclosure, the second upright frame assembly comprising an upright member having an upright open-ended internal channel formed therein;

a first connector bracket coupled to the rearward portion of the top portion of the enclosure, the first connector bracket having a first through-hole and a first keyway formed therein, the first through-hole being aligned with one of the open ends of the internal channel of the upright member of the first upright frame assembly;

a second connector bracket coupled to the rearward portion of the top portion of the enclosure, the second connector bracket having a second through-hole and a second keyway formed therein, the second through-hole being aligned with one of the open ends of the internal channel of the upright member of the second upright frame assembly;

a first latch mechanism configured to be coupled to the top trailer portion of the trailer, the first latch mechanism comprising a rotatable key member configured to be selectively rotatable between a locked position and an unlocked position, when in the unlocked position, the key member being receivable inside the keyway of the first connector bracket, and after being so received, the key member being rotatable to the locked position to couple the first connector bracket to the first latch mechanism;

a second latch mechanism configured to be coupled to the top trailer portion of the trailer, the second latch mechanism comprising a rotatable key member configured to be selectively rotatable between a locked position and an unlocked position, when in the unlocked position, the key member being receivable inside the keyway of the second connector bracket, and after being so received, the key member being rotatable to the locked position to couple the second connector bracket to the second latch mechanism; and a strap having a first end portion coupled to the first upright frame assembly and the second end portion coupled to the second upright frame assembly, the strap extending through the internal channel of the upright member of the first upright frame assembly, through the first through-hole of the first connector bracket, across a portion of the first connector bracket, across a portion of the second connector bracket, through the second through-hole of the second connector bracket, and through the internal channel of the upright member of the second upright frame assembly.

14. The device of claim 1, further comprising:

a plurality of stiffeners coupled to the enclosure and configured to at least partially define an outer shape of the enclosure.

15. The device of claim 14, wherein at least a first portion of the plurality of stiffeners are coupled to the first side portion of the enclosure, at least a second portion of the plurality of stiffeners are coupled to the second side portion of the enclosure, and at least a third portion of the plurality of stiffeners are coupled to the top portion of the enclosure, the first portion of the plurality of stiffeners being different from the second and third portions of the plurality of stiffeners, and the second portion of the plurality of stiffeners being different from the third portion of the plurality of stiffeners.

16. The device of claim 14, wherein the enclosure comprises a plurality of sleeves and each of the plurality of stiffeners is positioned inside a different one of the plurality of sleeves.

17. The device of claim 1, wherein the enclosure is configured to deform when the tractor is pivoted relative to the trailer.

* * * * *